(12) United States Patent
Suzuki

(10) Patent No.: US 8,983,698 B2
(45) Date of Patent: Mar. 17, 2015

(54) IN-VEHICLE APPARATUS FOR DETECTING COLLISION OF VEHICLE

(71) Applicant: Denso Corporation, Kariya, Aichi-pref. (JP)

(72) Inventor: Kyojiro Suzuki, Nagoya (JP)

(73) Assignee: Denso Corporation, Kariya (JP)

( * ) Notice: Subject to any disclaimer, the term of this patent is extended or adjusted under 35 U.S.C. 154(b) by 73 days.

(21) Appl. No.: 13/888,461

(22) Filed: May 7, 2013

(65) Prior Publication Data

US 2013/0304289 A1 Nov. 14, 2013

(30) Foreign Application Priority Data

May 14, 2012 (JP) ................................ 2012-110438

(51) Int. Cl.
| | | |
|---|---|---|
| *B60L 9/00* | (2006.01) | |
| *G06F 7/00* | (2006.01) | |
| *B60G 17/018* | (2006.01) | |
| *B60W 20/00* | (2006.01) | |
| *B60W 10/06* | (2006.01) | |
| *B60W 10/08* | (2006.01) | |
| *B60K 28/14* | (2006.01) | |

(52) U.S. Cl.
CPC .............. *B60W 20/00* (2013.01); *B60W 10/06* (2013.01); *B60W 10/08* (2013.01); *Y10S 903/93* (2013.01); *B60K 28/14* (2013.01); *B60Y 2400/3042* (2013.01); *Y02T 10/6286* (2013.01)
USPC ................. 701/22; 903/930; 701/36; 701/37; 701/45

(58) Field of Classification Search
USPC ......... 701/22, 36, 37, 45; 307/9.1, 10.6, 10.7, 307/30, 38; 280/734, 735; 180/282, 283; 903/930
See application file for complete search history.

(56) References Cited

U.S. PATENT DOCUMENTS 5,577,569 A * 11/1996 Nakashima ................... 180/169
5,608,629 A * 3/1997 Cuddihy et al. ................. 701/1

(Continued)

FOREIGN PATENT DOCUMENTS

| JP | 2005-212574 | 8/2005 |
| JP | 2009-017653 | 1/2009 |

(Continued)

OTHER PUBLICATIONS

Office action dated Mar. 11, 2014 in corresponding Japanese Application No. 2012-110438.

*Primary Examiner* — James Trammell
*Assistant Examiner* — Majdi Alsomiri
(74) *Attorney, Agent, or Firm* — Harness, Dickey & Pierce, PLC

(57) ABSTRACT

An in-vehicle apparatus for a vehicle driven by a first driving power source in a first driving mode and driven by a second diving power source in a second driving mode, includes: a collision detection device; a stopping device stopping the first and second driving modes when the collision detection device detects collision; a severity determination device determining a severity of collision indicative of a collision intensity; and a controller. Under a condition that the stopping device stops both of the first driving mode and the second driving mode, the controller executes one of recovery of both of the first driving mode and the second driving mode, recovery of one of the first driving mode and the second driving mode, and system shut-down according to the severity of collision.

12 Claims, 3 Drawing Sheets

(56) References Cited

U.S. PATENT DOCUMENTS

| | | | |
|---|---|---|---|
| 5,816,358 A * | 10/1998 | Adler et al. | 180/279 |
| 6,256,563 B1 * | 7/2001 | Blank et al. | 701/45 |
| 6,325,171 B1 * | 12/2001 | Masunari et al. | 180/279 |
| 6,417,579 B1 | 7/2002 | Lehnst et al. | |
| 6,591,924 B2 * | 7/2003 | Shimizu | 180/65.1 |
| 6,640,174 B2 * | 10/2003 | Schondorf et al. | 701/45 |
| 7,609,150 B2 * | 10/2009 | Wheatley et al. | 340/436 |
| 8,290,697 B2 * | 10/2012 | Coughlin | 701/123 |
| 2004/0049324 A1 * | 3/2004 | Walker | 701/1 |
| 2005/0165530 A1 | 7/2005 | Higuchi et al. | |
| 2008/0042813 A1 * | 2/2008 | Wheatley et al. | 340/435 |

FOREIGN PATENT DOCUMENTS

| | | |
|---|---|---|
| JP | 2011-155743 | 8/2011 |
| JP | 2012-065503 | 3/2012 |

* cited by examiner

FIG. 3

| ACT PROHIBIT DIAG | | AVOID COL | COL DET | | | |
|---|---|---|---|---|---|---|
| | | | SLIGHT CONTACT | LIGHT | MODERATE | HEAVY |
| | NO | AUTO RECOVER | MAINTAIN SYS WHEN PRE-CR SYS NOT FUNCTION | AUTO RECOVER | ONLY E/G AUTO RECOVERED | SYSTEM DOWN |
| | YES | SYSTEM DOWN | SYSTEM DOWN | SYSTEM DOWN | SYSTEM DOWN | |
| | | 1ST THRES | | 2ND THRES | | 3RD THRES |

SMALL ← COL INTENSITY → LARGE

US 8,983,698 B2

IN-VEHICLE APPARATUS FOR DETECTING COLLISION OF VEHICLE

CROSS REFERENCE TO RELATED APPLICATION

This application is based on Japanese Patent Application No. 2012-110438 filed on May 14, 2012, the disclosure of which is incorporated herein by reference.

TECHNICAL FIELD

The present disclosure relates to an in-vehicle apparatus for detecting a collision of a vehicle having a first driving mode with a first driving power source and a second driving mode with a second driving power source so that the apparatus responds to the collision.

BACKGROUND

There are many collision configurations of a vehicle, which collides with another vehicle or an object. The collision may trigger leakage of an electric power supplied to an electric motor as a driving power source of the vehicle or fuel leakage of an internal combustion engine as a driving power source of the vehicle.

Conventionally, in order to prevent from electric shock or fire caused by the leakage of the electric power or the fuel leakage, the electric power source for the driving power source turns off, or fuel supply to the engine is cut off according to a collision detection signal, which is output from a collision detection sensor such as an acceleration sensor, or according to a collision detection signal from an air bag ECU.

For example, in JP-A-2002-531310 corresponding to U.S. Pat. No. 6,417,579, when a detection device confirms that a starting device line, which has been cut off after the collision, is not short-circuited, and a bypass line for energizing a starting device is established via a connection device so that physical damage by the collision is not so large as to destroy an element for providing a starting current circuit, which is completed by the bypass circuit, the engine starts again.

However, when a system for shutting down the electric power supply and/or fuel supply of the driving power source functions, the supply of the electric power and/or the fuel are not automatically recovered. Thus, even if the damage is not serious so that the vehicle can go, the driver can not drive the vehicle. In this case, the driver has to transport the vehicle to a repair shop with using other options such as a towing service. Further, in a technique described in JP-A-2002-531310, if the driver drives the vehicle to run, it is necessary to establish a bypass circuit. Thus, it is necessary to prepare a specific device and technique, so that a manufacturing cost will increase.

SUMMARY

It is an object of the present disclosure to provide an in vehicle apparatus for controlling a vehicle to run if the vehicle is not seriously damaged so that a driver can drive the vehicle after collision.

According to an example aspect of the present disclosure, an in-vehicle apparatus is mounted on a vehicle having a first driving mode and a second driving mode. The vehicle is driven by a first driving power source in the first driving mode, and the vehicle is driven by a second diving power source, which is different from the first driving power source, in the second driving mode. The in-vehicle apparatus includes: a collision detection device for detecting a collision of the vehicle; a stopping device for stopping both of the first driving mode and the second driving mode when the collision detection device detects the collision of the vehicle; a severity determination device for determining a severity of collision based on an output from the collision detection device, the severity of collision being indicative of a collision intensity; and a controller. Under a condition that the stopping device stops both of the first driving mode and the second driving mode, the controller executes one of recovery of both of the first driving mode and the second driving mode, recovery of one of the first driving mode and the second driving mode, and system shut-down according to the severity of collision.

The above in-vehicle apparatus effectively responds to the collision. Specifically, when the controller executes the recovery of one of the first and second driving modes, a driver can drive the vehicle to a repair shop without calling a towing service.

BRIEF DESCRIPTION OF THE DRAWINGS

The above and other objects, features and advantages of the present disclosure will become more apparent from the following detailed description made with reference to the accompanying drawings. In the drawings:

FIG. 3 is a diagram showing a determination condition of collision intensity.

DETAILED DESCRIPTION

Figure 1:
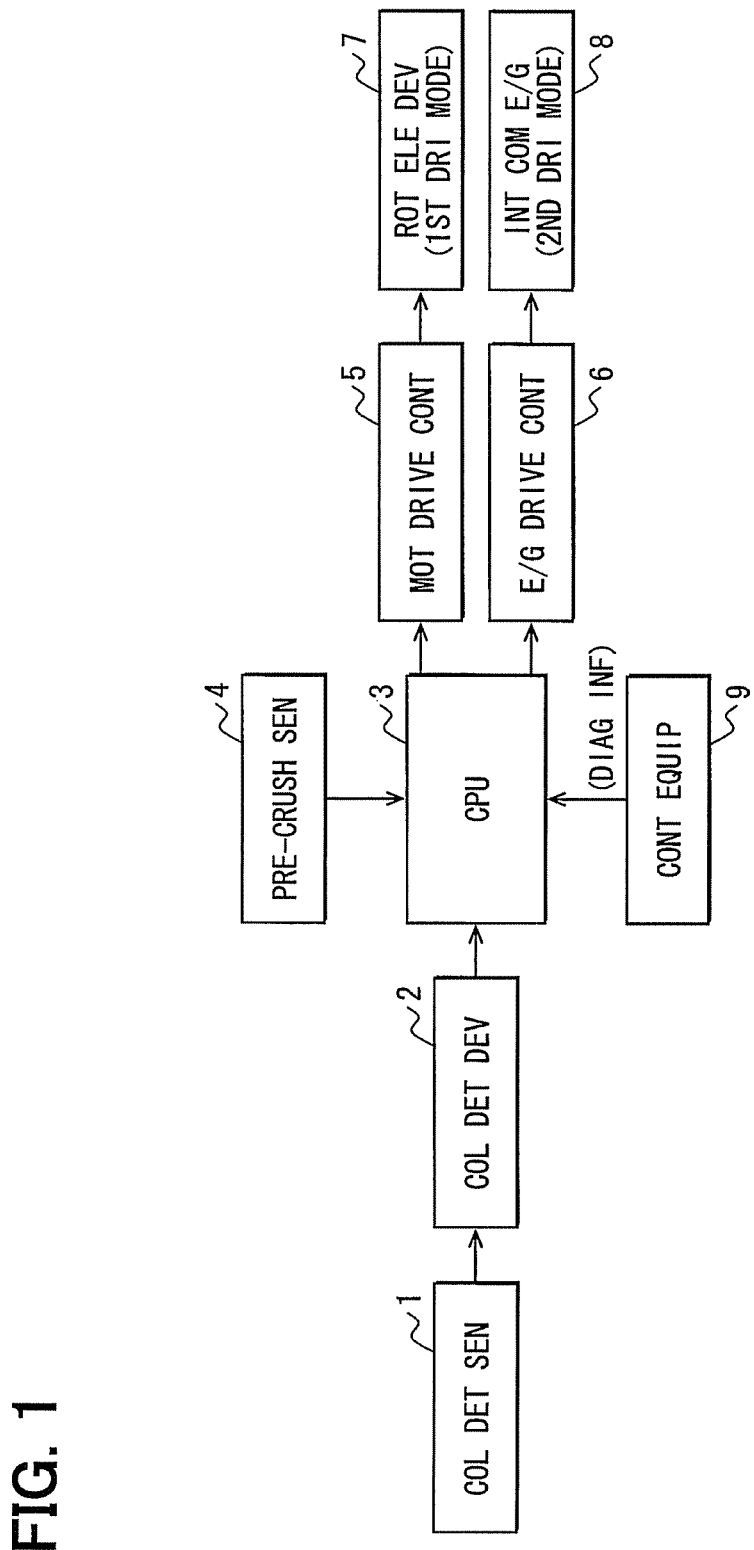
FIG. 1 is a block diagram showing an in-vehicle apparatus according to an example embodiment.

As shown in FIG. 1, a CPU (central processing unit) 3 as a controller is mounted on a vehicle (not shown). A collision detection signal from a collision detection determination device 2 and a collision prediction signal from a pre-crush sensor 4 are input into the CPU 3, so that the CPU 3 processes the collision detection signal and the collision prediction signal. Then, the CPU 3 outputs a control signal toward a motor drive control device 5 and an engine drive control device 6. Further, diagnosis information from a control equipment as a hybrid control system, a hybrid battery control system and an engine control system is input into the CPU 3. The CPU 3 processes the diagnosis information, and then, outputs the process results as calculation results based on the diagnosis information toward the motor drive control device 5 and the engine drive control device 6.

The collision detection sensor 1 is an acceleration sensor for detecting acceleration in a front-rear direction, in a right-left direction and in an up-down direction of the vehicle, which is generated by collision when the vehicle collides with something. Further, the sensor 1 outputs an acceleration signal to the collision detection determination device 2. The acceleration sensor 1 detects a position change of a weight, which is changeable by acceleration. The sensor 1 is a mechanical sensor, an optical sensor, or a semiconductor sensor. Further, the sensor 1 may be a single axis sensor or a multi-axis sensor. Each acceleration sensor may be selected according to a mounting place and an object of the sensor 1.

The collision detection determination device 2 compares the acceleration signal from the collision detection sensor 1 and various thresholds stored in the collision detection determination device 2 so that the device 2 outputs a collision determination signal. Further, the collision detection determination device 2 processes the acceleration signal from the collision detection sensor 1, and then, the device 2 outputs the processed signal to the CPU 3. The collision detection determination device 2 corresponds to an air bag ECU (electric control unit). The device 2 controls the air bag to inflate based on the collision determination signal. Here, the device 2 may be built in the collision detection sensor.

The pre-crush sensor 4 predicts the collision by detecting an object before the vehicle collides with the object. The sensor 4 outputs the collision prediction signal to the CPU 3. The CPU 3 executes a calculation process of the collision prediction signal. The pre-crush sensor 4 is a millimeter wave radar, a laser radar, or an infra-red light radar. Alternatively, the pre-crush sensor 4 may be a stereo camera.

The motor drive control device 5 adjusts electricity having a high voltage or a low voltage, which is supplied to a rotating electrical device 7 such as a motor as the driving power source of the vehicle, according to an instruction signal from the CPU 3. Further, the device 5 controls energization and shutdown of the electricity to the rotating electrical device 7 based on the instruction signal from the CPU 3. When the vehicle includes multiple rotating electrical devices 7 or multiple types of rotating electrical devices 7, multiple vehicle motor drive control devices 5 are mounted on the vehicle, each of which corresponds to a respective rotating electrical device 7.

The engine drive control device 6 controls a fuel valve of the fuel to be supplied to the internal combustion engine 8 as the driving power source of the vehicle based on the instruction signal from the CPU 3. Further, the device 6 fully opens and closes the fuel valve.

The engine drive control device 6 controls and operates the internal combustion engine 8 as the driving power source having a first drive mode. The motor drive control device 5 controls and operates the rotating electric device as the driving power source having a second drive mode. When the vehicle is an electric vehicle having no internal combustion engine, the vehicle includes another motor drive control device instead of the engine drive control device 6 so that two motor drive control devices 5 correspond to two rotating electric devices or two types of rotating electric devices. In this case, one rotating electric device 6 controls the first drive mode, and the other rotating electric device 6 controls the second drive mode.

The control equipment 9 includes the hybrid control system, the hybrid battery system and the engine control system. Each system diagnoses the system itself, and outputs diagnosis information. One item of the diagnosis information is diagnosis of vehicle activation prohibition. The diagnosis information includes collision determination detection diagnosis. When the vehicle activation prohibition diagnosis relating to the collision determination detection diagnosis is established, the driver can not drive the vehicle, i.e., the vehicle can not be activated. Accordingly, the vehicle activation prohibition diagnosis relating to diagnosis other than the collision determination detection diagnosis is used for determination of the driving power source control.

Figure 2:
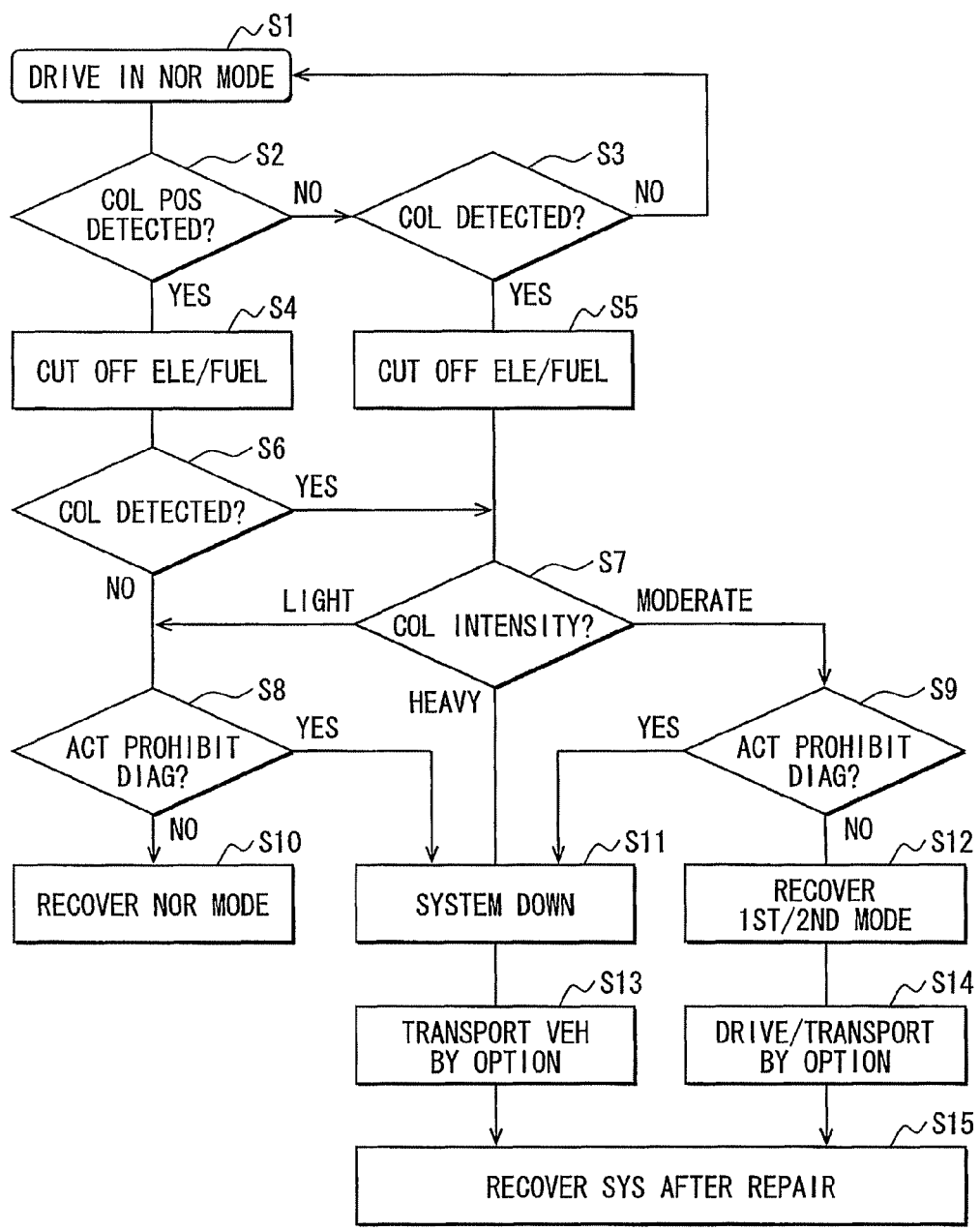
FIG. 2 is a flowchart showing a controlling process in the in-vehicle apparatus.

Next, a control process of the in-vehicle apparatus will be explained with reference to FIG. 2.

At step S1, the driver drives the vehicle in a normal driving mode with using the first and second driving modes. When the vehicle does not includes the pre-crush sensor 4, or when the pre-crush sensor 4 does not predict the collision in step S2, the determination of step S2 is "NO." In this case, it goes to step S3. In step S3, the collision detection determination device 2 executes collision detection process for detecting the collision based on the first threshold, which is smaller than the second threshold, as shown in FIG. 3. When the device 2 determines that the collision acceleration is smaller than the first threshold so that the collision is a slight contact, the determination in step S3 is "NO." In this case, the in-vehicle apparatus does not do anything, and it goes to step S1. Thus, the apparatus maintains the normal diving mode at step S1. When the device 2 determines that the collision acceleration is equal to or larger than the first threshold so that the collision is equal to or more than a light collision, the determination in step S3 is "YES." In this case, at step S5, the CPU 3 outputs the instruction signal to the motor drive control device 5 so that the device 5 shuts down the energization to the rotating electric device 7. Further, the CPU 3 outputs the instruction signal to the engine drive control device 6 so that the device 6 cuts off the fuel supply to the internal combustion engine 8. Thus, the CPU 3 executes a stop process for stopping the vehicle to run, i.e., the stop process for interrupting the first and second driving modes. Then, it goes to step S7.

When the pre-crush sensor 4 predicts the collision in step S2, the determination of step S2 is "YES." Then, it goes to step S4. In step S4, the CPU 3 outputs the instruction signal to the motor drive control device 5 so that the device 5 shuts down the energization to the rotating electric device 7. Further, the CPU 3 outputs the instruction signal to the engine drive control device 6 so that the device 6 cuts off the fuel supply to the internal combustion engine 8. Thus, the CPU 3 executes a stop process for stopping the vehicle to run, i.e., the stop process for interrupting the first and second driving modes. Then, it goes to step S6. In step S6, the collision detection determination device 2 executes collision detection process for detecting the collision based on the first threshold, which is smaller than the second threshold, as shown in FIG. 3. When the device 2 determines that the collision acceleration is equal to or larger than the first threshold so that the collision is equal to or more than a light collision, the determination in step S6 is "YES." Then, it goes to step S7.

At step S7, a severity determination process for determining the severity of collision is executed. The severity of collision indicates the collision intensity. As shown in FIG. 3, the CPU 3 determines the severity of collision by classifying the collision acceleration into three stages including a light stage, a moderate stage and a heavy stage based on the second threshold and the third threshold larger than the second threshold. Here, the three stages correspond to the severity. When the collision acceleration is equal to or larger than the first threshold and smaller than the second threshold, the CPU 3 determines that the severity of collision is in the light stage. In this case, it goes to step S8. Here, when the CPU 3 determines at step S6 that the collision is the slight contact, and the collision acceleration is smaller than the first threshold, i.e., when the determination in step S6 is "NO," it goes to step S8.

At step S8, the CPU 3 determines whether the vehicle activation prohibition diagnosis information exists in the control equipment 9. When the vehicle activation prohibition diagnosis information exists in the control equipment 9, at step S11, the CPU 3 outputs the instruction signal to both of the motor drive control device 5 and the engine drive control device 6 to stop the functions of the motor drive control device 5 and the engine drive control device 6 so that CPU 3 switches to the system down mode. When the vehicle activation prohibition diagnosis information does not exist in the control equipment 9, the determination in step S10 is "YES." Then it goes to step S10, and in step S10, the CPU 3 outputs the instruction signal to both of the motor drive control device 5 and the engine drive control device 6 to recover the energization and the fuel supply, which have been executed in step S4 or S5. Thus, the electric power is supplied to the rotating electric device 7, and the fuel is supplied to the internal combustion engine 8, again. The CPU 3 automatically recovers the normal driving mode with using the first and second driving modes.

When the collision acceleration is equal to or larger than the second threshold and smaller than the third threshold, the CPU 3 determines at step S7 that the collision severity is in the moderate stage. Then, it goes to step S9. In step S9, the CPU 3 determines whether the diagnosis information about the vehicle activation prohibition exists in the control equipment 9. When the diagnosis information about the vehicle activation prohibition exists in the control equipment 9, in step S11, the CPU 3 outputs the instruction signal to both of the motor drive control device 5 and the engine drive control device 6 to stop the functions of the motor drive control device 5 and the engine drive control device 6 so that CPU 3 switches to the system down mode. When the diagnosis information about the vehicle activation prohibition does not exist in the control equipment 9, in step S12, the CPU 3 outputs the instruction signal to the motor drive control device 5 to recovers the fuel supply to the internal combustion engine 8 so that the CPU 3 re-establishes the first driving mode, or outputs the instruction signal to the engine drive control device 6 to recover the energization to the rotating electric device 7 so that the CPU 3 re-establishes the second driving mode. In this case, since the electricity leakage attributed to the collision may exist in the rotating electric device 7, the internal combustion engine 8 may be recovered in propriety to the rotating electric device 7.

Thus, since at least one of the first and second driving modes is recovered in the vehicle, the driver can drive the vehicle or transport the vehicle by optional manners without towing service in step S14. In step S15, at a repair shop, a damage or a difficulty is checked, and the damage or the difficulty is repaired. Further, for example, the diagnosis information is reset. Thus, the functions of the vehicle are completely recovered.

At step S7, when the acceleration of the collision is equal to or larger than the third threshold, the CPU 3 determines that the severity of collision is in the heavy stage. Then, it goes to step S11, and the CPU 3 outputs the instruction signal to both of the motor drive control device 5 and the engine drive control device 6 to stop the functions of the motor drive control device 5 and the engine drive control device 6 so that CPU 3 switches to the system down mode. Then, in step S13, the vehicle is transported to the repair shop by a certain manner other than running by itself. In step S15, at a repair shop, a damage or a difficulty is checked, and the damage or the difficulty is repaired. Further, for example, the diagnosis information is reset. Thus, the functions of the vehicle are completely recovered.

In the in-vehicle apparatus according to the present embodiment, under a condition that the first and second driving modes are shut down in step S4, S5, the CPU 3 recovers both of the first and second driving modes, recovers one of the first and second driving modes, or switches to the system down mode, in accordance with the severity of collision, which is determined in the severity determination device of step S17. Therefore, the in-vehicle apparatus effectively handles the reaction of the collision in the vehicle.

Further, the severity determination device in step S7 classifies the severity of collision into three stages of the light, moderate and heavy stages. When the classified severity is the moderate stage, the CPU 3 executes to recover one of the first and second driving modes. Thus, the driver can drive the vehicle so as to transport the vehicle to the repair shop without calling the towing service. Further, the severity determination device in step S7 classifies the acceleration of collision in a wide range with using multiple thresholds. Thus, both of the setting degree of freedom about the thresholds and the safety of the vehicle are established. For example, even if the acceleration sensor has a tolerance of sensitivity in a wide range, the acceleration sensor can provide the minimum function. Furthermore, even if the dominance of the collision condition, which is the operational trigger, is reversed to the generated acceleration, which is not the operational trigger, attributed to the positional difference of the mounting place of the acceleration sensor, the in-vehicle apparatus maintains to control the vehicle appropriately.

When the diagnosis information indicative of the prohibition of the vehicle activation is input, the CPU 3 executes to stop functioning the system regardless of the severity of collision, which is detected by the severity determination device in step S7. Thus, the safety of the vehicle is secured.

Further, the vehicle includes the pre-crush sensor 4 for predicting the collision of the vehicle. Since the stop device in step S4 stops executing the first and second driving modes even when the pre-crush sensor 4 predicts the collision. Thus, the safety of the vehicle is secured.

Further, the collision detection devices in steps S3, S6 detects the collision based on the detected acceleration of the vehicle. The severity determination device in step S7 determines the severity of collision based on the collision acceleration detected by the collision detection devices in steps S3, S6. Thus, the collision of the vehicle is effectively detected and determined.

Further, in the first driving mode, the internal combustion engine drives the vehicle. In the second driving mode, the rotating electrical device 7 drives the vehicle. The stopping devices in steps S4, S5 cut off the fuel supply to the internal combustion engine and electric power supply to the rotating electrical device 7. Thus, the in-vehicle apparatus can effectively respond to the accident of the hybrid type vehicle.

Further, the severity determination device in step S7 classifies the severity of collision into three stages of the light, moderate and heavy stages. When the determined severity of collision is in the moderate stage, the CPU 3 recovers the first driving mode, in which the internal combustion engine functions, in priority to the rotating electrical device 7, in which the electricity leakage attributed to the collision may exist. Thus, the driver can drive the vehicle in safety and effectively.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An in-vehicle apparatus mounted on a vehicle having a first driving mode and a second driving mode, wherein the vehicle is driven by a first driving power source in the first driving mode, and the vehicle is driven by a second diving power source, which is different from the first driving power source, in the second driving mode, the in-vehicle apparatus comprising:
   a collision detection device for detecting a collision of the vehicle;
   a stopping device for stopping both of the first driving mode and the second driving mode when the collision detection device detects the collision of the vehicle;

a severity determination device for determining a severity of collision based on an output from the collision detection device, the severity of collision being indicative of a collision intensity; and a controller, wherein:

under a condition that the stopping device stops both of the first driving mode and the second driving mode, the controller executes one of recovery of both of the first driving mode and the second driving mode, recovery of one of the first driving mode and the second driving mode, and a system shut-down according to the severity of collision.

2. The in-vehicle apparatus according to claim 1, wherein:

the severity determination device classifies the severity of collision into three stages, which include a light stage, a moderate stage and a heavy stage;

when the severity of collision is in the light stage, the controller executes the recovery of both of the first driving mode and the second driving mode;

when the severity of collision is in the moderate stage, the controller executes the recovery of one of the first driving mode and the second driving mode; and when the severity of collision is in the heavy stage, the controller executes the system shut-down.

3. The in-vehicle apparatus according to claim 1, wherein:

when diagnosis information indicative of vehicle activation prohibition is input into the controller, the controller executes the system shut-down regardless of the severity.

4. The in-vehicle apparatus according to claim 1, further comprising:

a pre-crush sensor for predicting the collision of the vehicle, wherein:

the stopping device stops both of the first driving mode and the second driving mode when the pre-crush sensor predicts the collision of the vehicle.

5. The in-vehicle apparatus according to claim 1, wherein:

the collision detection device detects the collision of the vehicle based on collision acceleration of the vehicle; and the severity determination device determines the severity of collision based on the collision acceleration of the vehicle.

6. The in-vehicle apparatus according to claim 1, wherein:

in the first driving mode, an internal combustion engine as the first driving power source drives the vehicle;

in the second driving mode, a rotating electrical device as the second driving power source drives the vehicle; and the stopping device interrupts a fuel supply to the internal combustion engine and an electric power supply to the rotating electrical device when the collision detection device detects the collision of the vehicle.

7. The in-vehicle apparatus according to claim 6, wherein:

the severity determination device classifies the severity of collision into three stages, which include a light stage, a moderate stage and a heavy stage;

when the severity of collision is in the light stage, the controller executes the recovery of both of the first driving mode and the second driving mode;

when the severity of collision is in the moderate stage, the controller executes the recovery of the first driving mode; and when the severity of collision is in the heavy stage, the controller executes the system shut-down.

8. The in-vehicle apparatus according to claim 1, wherein the vehicle is directly driven by the first driving device in the first driving mode and the vehicle is directly driven by the second driving device in the second driving mode.

9. An in-vehicle apparatus mounted on a vehicle having a first driving mode and a second driving mode, wherein the vehicle is directly driven by a first driving power source in the first driving mode, and the vehicle is directly driven by a second diving power source, which is different from the first driving power source, in the second driving mode, the in-vehicle apparatus comprising:

a collision detection device for detecting a collision of the vehicle;

a stopping device for stopping both of the first driving mode and the second driving mode when the collision detection device detects the collision of the vehicle;

a severity determination device for determining a severity of collision based on an output from the collision detection device, the severity of collision being indicative of a collision intensity; and a controller, wherein:

under a condition that the stopping device stops both of the first driving mode and the second driving mode, the controller executes one of three processes, the first process being recovery of both of the first driving mode and the second driving mode, the second process being recovery of one of the first driving mode and the second driving mode, and the third process being a system shut-down according to the severity of collision.

10. The in-vehicle apparatus according to claim 9, wherein:

the severity determination device classifies the severity of collision into three stages, which include a light stage, a moderate stage and a heavy stage;

when the severity of collision is in the light stage, the controller executes the first process;

when the severity of collision is in the moderate stage, the controller executes the second process; and when the severity of collision is in the heavy stage, the controller executes the third process.

11. A vehicle in combination with an in-vehicle apparatus mounted on the vehicle, the combination comprising:

a first driving power source directly driving the vehicle in a first driving mode;

a second driving power source different than the first driving power source driving the vehicle in a second driving mode, the in-vehicle apparatus comprising:

a collision detection device for detecting a collision of the vehicle;

a stopping device for stopping both of the first driving mode and the second driving mode when the collision detection device detects the collision of the vehicle;

a severity determination device for determining a severity of collision based on an output from the collision detection device, the severity of collision being indicative of a collision intensity; and a controller, wherein:

under a condition that the stopping device stops both of the first driving mode and the second driving mode, the controller executes one of three processes, the first process being recovery of both of the first driving mode and the second driving mode, the second process being recovery of one of the first driving mode and the second driving mode, and the third process being a system shut-down according to the severity of collision.

12. The in-vehicle apparatus according to claim 11, wherein:

the severity determination device classifies the severity of collision into three stages, which include a light stage, a moderate stage and a heavy stage;

when the severity of collision is in the light stage, the controller executes the first process;
when the severity of collision is in the moderate stage, the controller executes the second process; and
when the severity of collision is in the heavy stage, the controller executes the third process.

* * * * *